Patented May 17, 1949

2,470,688

UNITED STATES PATENT OFFICE 2,470,688

ALKALI-ALKALINE EARTH HYDROXIDE-IMPREGNATED CARBON CATALYST AND ITS PREPARATION

Austin George Carter, Swansea, Wales, assignor to American Magnesium Metals Corporation, Pittsburgh, Pa.

No Drawing. Application June 15, 1946, Serial No. 677,085. In Great Britain August 28, 1945

4 Claims. (Cl. 252—425)

This invention relates to the composition and preparation of catalysts.

It has now been found that there is a liability of magnesium oxide catalysts to disintegrate and lose their catalytic property if the temperature and pressure conditions are such as to allow liquid water to react with any magnesium oxide which may be present to form or reform hydroxide of magnesium with the evolution of steam by the heat of the reaction. The steam so generated causes an internal rise of pressure sufficient to disintegrate the material to a fine powder which retains little or no catalytic influence. The conditions which bring this about are extremely difficult to avoid in practice.

This tendency to disintegrate materially limits the use of the above catalysts.

The object of the present invention is to provide improved catalysts which are not subject to the above defect and are therefore of more general application.

As the result of researches it has now been found, first that it is essential that the catalyst mass shall contain magnesium hydroxide or an alkaline earth hydroxide in contrast to magnesium oxide whether the oxide be provided as such, or in the process of use by maintaining the corresponding hydroxide or carbonate at a temperature higher than the decomposition temperature of magnesium carbonate at which, even in the presence of steam, the oxide is formed. Next the magnesium hydroxide or other alkaline earth hydroxide must be associated with certain other ingredients referred to below. Thus the hydroxides of magnesium and alkaline earth metals or mixtures of these when mixed with carbonaceous matter, and an alkali carbonate or hydroxide and suitably bound and formed, will exercise catalytic functions and the catalyst so formed is not subject to the distintegration disadvantage provided that the temperature and pressure during catalysis are so maintained that dissociation of the hydroxide of the magnesium or alkaline earth metal cannot take place, a condition which is far more easily achieved than that which is necessary to the successful operation of the magnesium oxide containing catalyst.

The relationship between the dissociation pressure and the dissociation temperature for any of the hydroxides named can be ascertained by reference to known and published data. The relationship so ascertained will indicate for any composition the range of interrelated temperatures and pressures within which the stability of the hydroxide and therefore of the catalytic mass is assured.

To illustrate the foregoing below is given the temperatures at which certain hydroxides will dissociate with the formation of the oxides in the presence of a partial pressure of steam of one atmosphere:

Magnesium hydroxide about 380° C.
Calcium hydroxide about 547° C.
Strontium hydroxide about 778° C.
Barium hydroxide about 998° C.

From the above and similar data the most suitable hydroxide to catalyse any particular reaction requiring the presence of steam under predetermined conditions of temperature and pressure may be selected without difficulty.

The invention consists in a catalyst mass comprising an agglomerated or briquetted mixture containing at least one of the materials in each of the following groups (a), (b) and (c), namely:

(a) Amorphous carbon;
(b) One or more of the hydroxides of magnesium, calcium, strontium, barium and beryllium;
(c) Alkali hydroxides or carbonates.

The invention also consists in a catalyst mass in accordance with the preceding paragraph containing the following ingredients within the ranges specified, namely:

Per cent
Magnesium hydroxide_____ 20-50 or a chemically equivalent amount of any other ingredient given in item (b) above, and potassium carbonate from 5-20% or a chemically equivalent amount of any ingredient given in item (c) above.

Amorphous carbon to_____ 100

The invention also consists in catalyst masses in accordance with either of the preceding two paragraphs prepared by mixing an oxide of magnesium or of calcium, barium, strontium, beryllium, or corresponding hydroxide or other substance convertible to the oxide form, or mixtures of two or more of such oxides or hydroxides or both, with charcoal, activated carbon or carbonaceous matter which on calcination will produce amorphous carbon, and the other constituents for the catalyst mass, after which the mixture is heated to remove volatile mater and to convert the aforesaid convertible ingredient or ingredients into the oxide form and the product then treated with water for the conversion of the oxide or oxides into the corresponding hydroxide or hydroxides.

The invention also consists in methods for making catalyst masses substantially as herein described.

The invention also consists in catalyst masses of compositions substantially as herein described.

The invention further consists in catalyst masses of compositions substantially as herein described made by methods substantially as herein described.

In carrying the invention into effect in one form by way of example to provide a catalyst especially suitable for catalytic reactions to be carried out efficiently in the lower ranges of temperature at appropriate pressures, namely, at 400° C. or less or at a partial pressure of steam greater than one atmosphere or a combination of these conditions, a catalyst is formed by suitable incorporation of the following ingredients in substantially the proportions given, namely:

| | |
|---|---|
| Charcoal, 40 parts by weight | =28% |
| Magnesium hydroxide, 58 parts by weight | =40% |
| Ferric oxide, 5 parts by weight | = 4% |
| Potassium carbonate, 15 parts by weight | =10% |
| Aqueous emulsion of tar, 25 parts by weight | =18% |
| | 100% |

The magnesium hydroxide is preferably derived from caustic reactive magnesium oxide.

The charcoal and magnesium hydroxide are mixed together with the ferric oxide, and the mixture is then finely ground. Potassium carbonate is added to the fine powder which is then mixed with the aqueous tar emulsion together with sufficient water to make the mass into a moderately stiff dough. This is then allowed to dry in air for twenty-four hours, and is then granulated. The granules are further dried in an air oven at approximately 50° C. prior to briquetting.

The briquettes are calcined in an inert atmosphere at approximately 800° C. until volatiles have been substantially removed, are cooled, and hydrated by the application of water preferably as a fine spray which results in the reformation of the hydroxide of magnesium. The briquettes may then safely be exposed and dried in a warm current of air to a hard and resistant condition.

According to a further example, to provide a catalyst for processes requiring temperatures between 400° C. and 600° C. at high or low steam partial pressures the following composition has been found to give good results:

| | |
|---|---|
| Charcoal, 40 parts by weight | =30% |
| Strontium hydroxide, 50 parts by weight | =37% |
| Ferric oxide, 5 parts by weight | = 4% |
| Potassium carbonate, 15 parts by weight | =11% |
| Aqueous emulsion of tar, 25 parts by weight | =18% |
| | 100% |

The strontium hydroxide should preferably be derived from caustic reactive strontium oxide, and the briquettes prepared by the method described in the previous example, the strontium hydroxide being thus converted into strontium oxide which is reconverted into the hydroxide.

*General*

The ultimate ingredients of the catalyst mass have been given in items (a), (b) and (c) above. The starting materials for the ingredients given in item (b) must be the oxide or hydroxide, or compounds capable of forming the oxide on calcination and from that the corresponding hydroxide on subsequent treatment with water. The calcination temperature is determined by the decomposition characteristics of the compound chosen, but in any case it should be high enough to carbonise the carbonaceous material present, for which purpose a temperature within the range of 700–850° C. is generally satisfactory.

The preferred tolerance for the principal ingredients of the catalyst masses is shown by the ranges indicated above. As regards ferric oxide, when that is used the preferred tolerance is ±2½% with respect to the figure given in the examples.

As examples of the range of the reactions in addition to that of carbon monoxide and steam which may be brought about by catalysts made in accordance with the methods described above, the following are quoted:

(1) The removal of carbon disulphide from gases by the reactions $CS_2+2H_2O \rightleftharpoons CO_2+2H_2S$;
(2) The conversion of acetylene into acetone or alcohols by means of steam;
(3) The conversion of pythalic acid or anhydride to benzoic acid in the presence of steam;
(4) The conversion of ethylene into alcohol or ether in presence of steam.

The invention does not embrace the use of the catalysts either for the production of hydrogen or by way of improvement or addition to known processes for that purpose nor to any other process of user.

I claim:

1. A catalyst mass comprising a coherent mixture containing as essential active constituents amorphous carbon, at least one hydroxide of the group consisting of the hydroxides of magnesium, calcium, strontium, barium and beryllium, and at least one material of the group consisting of alkali hydroxides and carbonates.

2. A catalyst mass comprising a coherent mixture containing as essential active constituents 20 to 50 per cent by weight of at least one hydroxide of the group consisting of hydroxides of magnesium, calcium, strontium, barium and beryllium, 5 to 20 per cent of at least one material of the group consisting of alkali hydroxides and carbonates, and the remainder substantially all amorphous carbon.

3. A catalyst mass comprising a coherent mixture containing as essential active constituents 20 to 50 per cent of magnesium hydroxide, 5 to 20 per cent of potassium carbonate, and the remainder substantially all amorphous carbon.

4. A method of making catalyst masses comprising mixing at least one material of the group consisting of compounds of calcium, barium, strontium, beryllium and magnesium convertible to the corresponding oxide upon calcination, at least one material of the group consisting of alkali hydroxides and carbonates, and a carbonaceous material productive of amorphous carbon upon calcination, then heating the mixture to drive off volatile matter and to convert the material of the first-named group and the carbonaceous material, respectively, to the corresponding oxide and amorphous carbon, and then treating the product with water to convert the said corresponding oxide to the hydroxide.

AUSTIN GEORGE CARTER.

REFERENCES CITED

The following references are of record in the file of this patent:

UNITED STATES PATENTS

| Number | Name | Date |
|---|---|---|
| 1,626,848 | Liebknecht | May 3, 1927 |
| 1,926,587 | Hansgirg | Sept. 12, 1933 |
| 2,056,854 | Hene | Oct. 6, 1936 |
| 2,200,463 | Alexander | May 14, 1940 |
| 2,216,437 | Halbig et al. | Oct. 1, 1940 |
| 2,395,875 | Kearby | Mar. 5, 1946 |